UNITED STATES PATENT OFFICE.

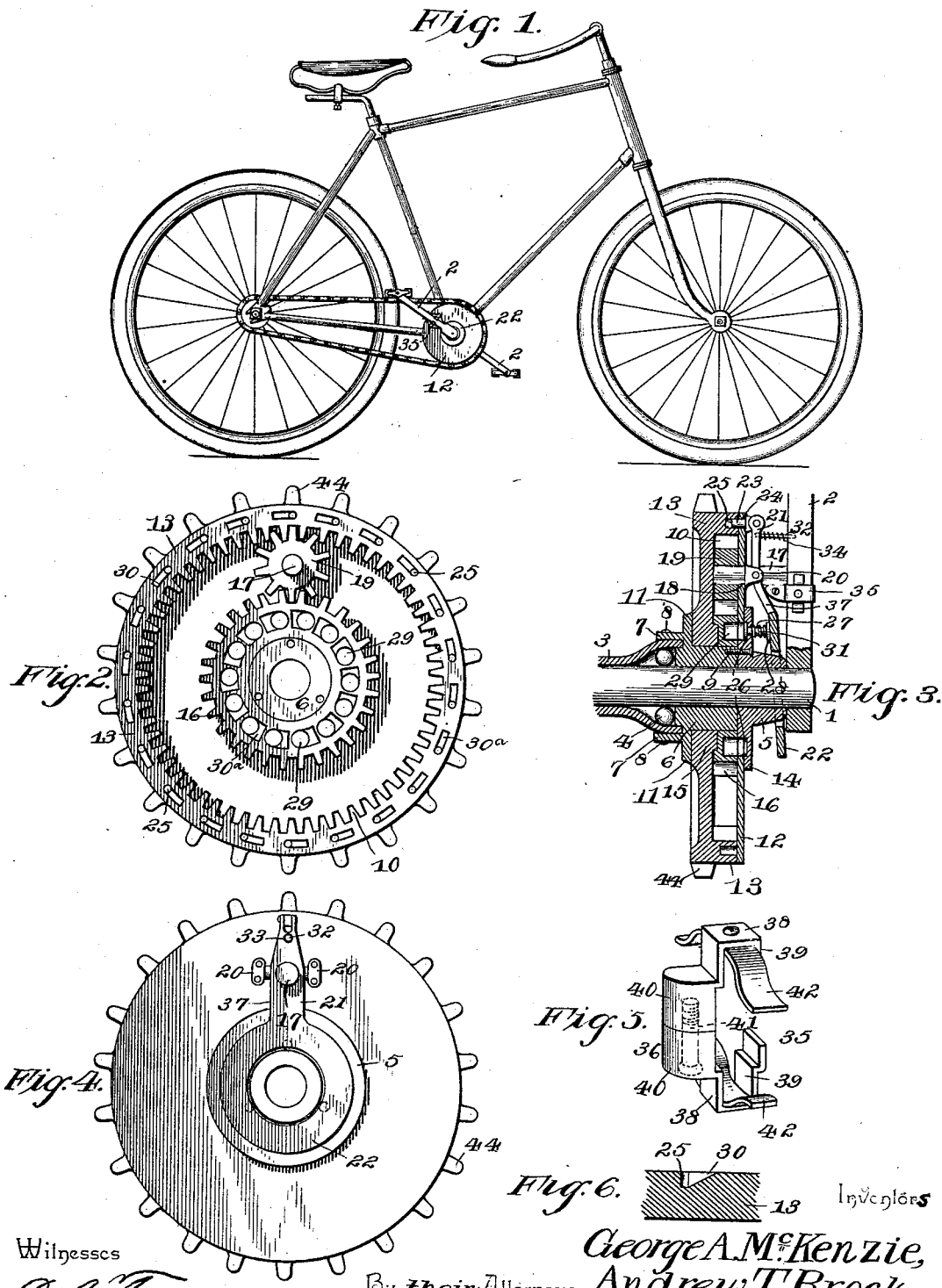

GEORGE A. McKENZIE AND ANDREW T. BROCK, OF WEST BAY CITY, MICHIGAN.

BICYCLE SPEED-GEARING.

SPECIFICATION forming part of Letters Patent No. 512,479, dated January 9, 1894.

Application filed August 29, 1893. Serial No. 484,308. (No model.)

*To all whom it may concern:*

Be it known that we, GEORGE A. MCKENZIE and ANDREW T. BROCK, citizens of the United States, residing at West Bay City, in the county of Bay and State of Michigan, have invented a new and useful Bicycle Speed-Gearing, of which the following is a specification.

Our invention relates to speed-gearing for bicycles, tricycles, and other vehicles and machinery in which it is desirable, with a given speed of rotation of a crank, to derive varying speeds of a power-receiving gear or wheel, the objects in view being to provide a simple, durable and efficient construction adapted to be arranged in a convenient and compact form and having means for adjustment whereby the speed may be applied directly, or multiplied, at the will of the operator.

Further objects and advantages of this invention will appear in the following description, and the novel features thereof will be particularly pointed out in the appended claims.

In the drawings: Figure 1 is a view of a bicycle provided with a speed-gearing embodying our invention. Fig. 2 is a side view of the gearing with the cap-plate and hub removed. Fig. 3 is a vertical central section of the same. Fig. 4 is a side view of the gearing to show the construction and arrangement of the shifting lever. Fig. 5 is a detail in perspective of the trip for operating the shifting lever. Fig. 6 is a detail section through one of the sockets in the rim of the internal gear.

Similar numerals of reference indicate corresponding parts in all the figures of the drawings.

1 designates a rotatable crank-shaft, to which is fixed the crank-arm 2.

3 represents the axle-box, 4 the anti-friction balls or rollers, and 5 the fixed hub, all of the ordinary construction.

6 represents a sleeve or bushing, which is fitted upon the crank-shaft between the hub and the axle-box and is provided with an overhanging flange 7, secured permanently, by screws 8, to the axle-box, said sleeve or bushing being secured to the hub 5 by means of screws 9.

10 represents an internal gear, which is revolubly mounted upon the sleeve or bushing, being held in place by a peripheral rim 11 thereof, and 12 represents a cap-plate, which is revolubly mounted upon the hub 5 with its inner surface in contact with the flange 13 of the internal gear, said cap-plate being held in position upon the hub by means of a flange 14.

Rotatably mounted upon the sleeve or bushing 6, contiguous to the hub 15 of the internal gear, is a central gear 16, provided with exterior gear-teeth which are in the plane of the internal teeth of the gear 10.

17 represents a stub-shaft, which is fixed rigidly at its outer extremity to the crank-arm and extends through an aperture 18 in the cap-plate with its inner extremity contiguous to the web of the internal gear. Upon this stub-shaft, and between the planes of the cap-plate and the web of the internal gear is mounted a planetary gear 19, which meshes simultaneously with the teeth of the gears 10 and 16. Pivotally connected to the cap-plate, by means of ears 20, is a shifting lever 21, provided at its lower end with a ring or eye 22, which encircles the hub and allows free motion of the lever, and provided at its free outer end with a locking-pin 23, which is arranged in alignment with a guide-perforation 24, in the cap-plate and is adapted to engage one of a series of sockets 25 in the flange of the internal gear. Fitted slidably in a guide-perforation 26 in the stationary hub is a locking-pin 27, having terminal enlargements or heads 28, and adapted to engage one of a series of sockets 29, in the central gear 16. The sockets 25 and 29 are provided respectively with beveled sides 30 and 30ª, in the direction of rotation of the gears to facilitate the engagement of the locking-pins with such sockets while the mechanism is in operation. An actuating spring 31 is coiled upon the shank of the pin 27 to normally hold the latter extended with its inner end out of engagement with the gear 16. A guide-pin 32 is fixed to the crank-arm and fits in the perforation 33 near the upper end of the shifting lever, and a spring 34 is coiled upon such pin between the lever and the crank-arm to actuate the former to engage the sockets of the internal gear. Slidably fitted upon the crank-arm is a trip 35, which is provided with a cam-head 36 to engage a beveled offset 37 of the shifting lever, whereby when the trip is moved toward the center of the mechanism or fulcrum of the crank-arm, the cam-head slides upon the beveled offset of the shifting lever and swings the inner end of the latter toward the plane of the gears, thus repressing the locking-pin 27 and causing it to engage the central gear 16. Normally the shifting lever occupies the position shown in Fig. 3, in which the outer locking-pin 23 is engaged with the internal gear, being so held by the spring 34. The trip is composed of opposite yokes 38, provided with guides 39 and lateral lugs 40, which are connected to secure the trip in place upon the crank-arm by means of a screw 41. Fixed to the looped ends of these yokes are the semi-elliptic springs 42, provided with curved terminals 43, which contact frictionally with the opposite surfaces of the crank-arm, and thus permit free adjustment of the trip and at the same time hold the latter in its set positions without supplemental fastening means.

In the construction illustrated in the drawings the device is adapted especially for use in connection with a bicycle, and the internal gear 10 is provided with peripheral sprocket-teeth 44 for the engagement of a chain whereby the power is communicated to the driving-wheel. This portion of the mechanism, as well as other details of construction hereinbefore described, may be modified to a greater or less extent to adapt the mechanism for use in connection with vehicles or machinery of different kinds and for different purposes.

In operation when the parts are in the positions shown in Fig. 3, in which the outer locking-pin 23 is engaged with the internal gear, the latter is rotated coincidently with, and at the same speed as, the crank-arm. If it is desired to increase the speed of the internal or chain-carrying gear, the trip is moved toward the inner end of the crank-arm, thus repressing the inner end of the shifting lever and causing the inner locking-pin 27 to engage the central gear 16. This locks the central gear to the stationary hub and prevents the rotation thereof, and therefore the planetary gear is caused to rotate around this fixed gear with the result that the internal gear which meshes with the outer side of the planetary gear is rotated at an increased speed which is proportionate to the relative diameters of the intermeshing gears and the relative number of teeth with which they are provided.

Having described our invention, what we claim is—

1. In a speed gearing, the combination with a stationary hub and a crank-arm, of an internal gear, a central gear, an interposed planetary gear carried by the crank-arm, locking devices for connecting the internal gear to the crank-arm, and alternative means for securing the central gear to the hub, substantially as specified.

2. The combination with a stationary hub and a crank-arm, of internal, central and planetary gears, the latter being carried by the crank-arm, a shifting lever, and locking-pins operatively connected to the shifting lever and adapted to engage the internal and central gears respectively, said lever being carried by the crank-arm, substantially as specified.

3. The combination with a stationary hub and a crank-arm, of an internal, a central and an interposed planetary gear, the latter being carried by the crank-arm, a locking-pin adapted to engage the central gear and mounted upon the hub, a shifting lever carried by the crank-arm in operative relation to said locking-pin, and a second locking-pin carried by the shifting lever to engage the internal gear, substantially as specified.

4. The combination with a stationary hub and a crank-arm, of an internal gear, a central gear, a planetary gear mounted upon a stub-shaft carried by the crank arm and engaging said internal and central gears, a rotatable cap-plate connected to the crank-arm for simultaneous rotation, locking-pins fitted in guide-openings in the hub and cap-plate, respectively, to engage the central and internal gears alternately, and a shifting lever carried by the cap-plate in operative relation to said locking-pins and adapted to alternately actuate said pins to engage their respective gears, substantially as specified.

5. The combination with a stationary hub and a crank-arm, of an internal gear, a central gear, and an interposed planetary gear carried by the crank-arm, a locking-pin mounted upon the hub to engage said central gear, a shifting lever carried by the crank-arm in operative relation with said locking-pin and provided with a second locking-pin to engage the internal gear, and a trip carried by the crank-arm to engage the shifting lever, whereby the latter may be adjusted to actuate the locking-pins, substantially as specified.

6. The combination with a stationary hub and a crank-arm, of an internal gear, a central gear, an interposed planetary gear carried by the crank-arm, a locking-pin mounted upon the hub to engage the central gear, a shifting lever carried by the crank-arm in operative relation with said locking-pin and provided with a locking-pin to engage the internal gear, and a trip slidably mounted upon the crank-arm and provided with a head to engage a beveled offset of the shifting lever, substantially as specified.

7. The combination with a stationary hub and a crank-arm, of an internal gear, a central gear, a planetary gear carried by the crank-arm, a shifting lever also carried by the crank-arm and provided with a beveled offset, locking-pins operatively connected to the shifting lever to engage said internal and central gears respectively, and a trip slidably mounted upon the crank-arm and comprising opposite twin connected yokes, and springs arranged in said yokes to contact frictionally with the surfaces of the crank-arm, substantially as specified.

8. The combination with a stationary hub and a crank-arm, of an internal gear, a central gear, a planetary gear carried by the crank-arm, a cap-plate connected to the crank-arm for simultaneous rotation, a locking-pin mounted in the hub to engage a socket in the central gear and provided with a retracting spring, a trip lever pivotally mounted upon the cap-plate in operative relation with said locking-pin, a second locking-pin connected to the shifting lever, fitting in a guide-perforation in the cap-plate and adapted to engage a socket in the internal gear, an actuating spring connected to the shifting lever to hold said second locking-pin normally in its operative position, and a trip for reversing the shifting lever, substantially as specified.

In testimony that we claim the foregoing as our own we have hereto affixed our signatures in the presence of two witnesses.

GEORGE A. McKENZIE.
ANDREW T. BROCK.

Witnesses:
W. D. McKENZIE,
WILLIAM BROWN.